Patented Mar. 9, 1937

2,073,086

UNITED STATES PATENT OFFICE 2,073,086

DYESTUFFS OF THE XANTHONE TYPE AND PROCESS FOR PRODUCING THE SAME

Carl Winter and Emil Kern, Ludwigshafen-on-the-Rhine, Germany, assignors to General Aniline Works, Inc., New York, N. Y., a corporation of Delaware No Drawing. Application April 4, 1934, Serial No. 719,045. In Germany April 12, 1933

12 Claims. (Cl. 260—62)

The present invention relates to new valuable dyestuffs and a process of producing same.

We have found that valuable dyestuffs are obtained by causing a compound of the general formula—

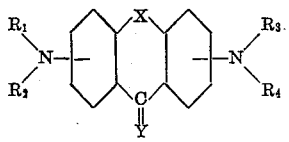

(in which $R_1$, $R_2$, $R_3$ and $R_4$ represent hydrogen atoms or alkyl, cycloalkyl, aryl or aralkyl radicles, X represents an oxygen or sulphur atom and Y an oxygen or sulphur atom or 2 chlorine atoms) to react with a nitrogen compound selected from the class consisting of ammonia and the primary and secondary amines, with the elimination of Y and the formation of a linkage between the carbon atom to which Y is attached and the nitrogen atom of the said nitrogen compound.

The compounds corresponding to the above formula comprise aminated xanthones, xanthiones, thioxanthones, thioxanthiones and their keto chlorides (for example those aminated in the 3- and 6-positions) which may be substituted in the amino groups by alkyl groups, such as methyl, ethyl, propyl, butyl, hydroxy-ethyl or the like, by cycloalkyl groups such as cyclohexyl, by aryl groups such as phenyl, tolyl, xylyl, naphthyl or the like or arakyl radicles such as benzyl or the like. Suitable primary and secondary amines are open chain aliphatic amines such as methyl-, mono- or dipropyl amine or ethanol amine, cycloaliphatic amines, such as cyclohexyl amine, aromatic amines such as aniline or naphthylamine and heterocyclic amines such as piperidine. Instead of ammonia agents supplying the same under the reaction conditions may be employed; for example the xanthones or the like may be heated with urea.

In all cases the reaction leading to the dyestuffs consists in the replacement of the atoms attached to the carbon atom which connects the two aromatic nuclei (Y in the above formula) by an amino or substituted amino group. The course of the reaction corresponds to the following scheme:

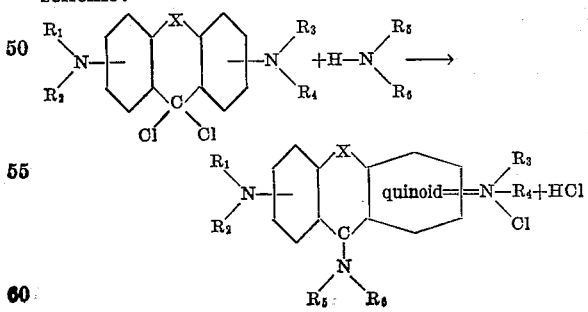

(wherein $R_1$, $R_2$, $R_3$, $R_4$ and X have the meaning indicated above and—

represents the radicle of ammonia or a primary or secondary amine). If instead of a keto chloride (given in the above scheme by way of example) the xanthones, thioxanthones and the like are used themselves, the course of reaction is analogous. Instead of the chlorine atom shown in the above formula of the final dyestuff other radicles capable of reacting as negative radicles in quaternary ammonium compounds may be attached to the nitrogen atom fixed to the quinoid nucleus; such radicles are hydroxyl and the radicles of inorganic and organic acids such as sulphuric, hydrocyanic, acetic and benzoic acid. By the addition of bases such as caustic soda solution the dyestuff bases are formed from which by the addition of acids the salts of the dyestuffs with the said acids result.

The formation of the dyestuffs may be effected for example by allowing the reaction mixture to stand at room temperature or by heating; the reaction may be carried out in the absence or presence of condensing agents such as zinc chloride. The periods of reaction vary according to the nature of the components, the temperature, the presence of condensing agents and the further conditions. At room temperature usually longer periods are required than at elevated temperatures. The ordinary range of temperature used is between about 0° and about 100° C. The reaction may be effected in the absence of diluents or in the presence thereof; suitable diluents are for example organic solvents such as chloroform, tetrachlorethane, benzene, toluene and the like. A preferred form of carrying out the reaction consists in working in aqueous media; if cyclic amines such as aniline are used it is necessary to work in the presence of water.

The dyestuffs obtained show a behaviour, similar to that of the diaminodiarylmethane series and yield brilliant dyeings of great strength of color. They are distinguished, as compared with dyestuffs of the said series, by good stability to boiling and good fastness to acids and can be used for all purposes for which basic diphenyl and triphenyl methane dyestuffs are suitable.

The following examples will further illustrate the nature of this invention but the invention is not restricted to these examples. The parts are by weight.

Example 1

3.6-tetramethyldiamino-xanthone chloride (prepared from 3.6-tetramethyldiamino-xanthone or -xanthione and phosphorus oxychloride or phosgene with or without solvents) is dissolved in water and an excess of aqueous ammonia is added. The whole is heated for a short time at 80° C., a compound being thus precipitated which dissolves in dilute acetic acid and is reprecipitated from the solution by the addition of common salt. The resulting dyestuff yields very brilliant and clear dyeings on paper which have a good stability to boiling.

The same dyestuff is obtained by treating the keto chloride with gaseous ammonia while stirring until unchanged initial material can no longer be detected.

Instead of the 3.6-tetramethyl compound the corresponding symmetrical dimethyl diphenyl compound or dimethyl dibenzyl compound or dimethyl dicyclohexyl compounds may be used whereby dyestuffs of somewhat deeper shades are obtained.

*Example 2*

100 parts of 3.6-diethyldiamino-2.7-dimethylxanthone chloride (prepared in a manner similar to that described in Example 1) are dissolved in 1000 parts of water and 100 parts of cyclohexylamine are added. The reaction proceeds without supplying heat. After working up in the manner described in Example 1, a greenish-yellow dyestuff is obtained which shows a strong fluorescence. A dyestuff having similar properties is obtained by causing 3.6-tetramethyldiamino-xanthone chloride to react with cyclohexylamine.

If instead of the said diethyldiamino compound the corresponding compound with free amino groups is used a dyestuff of somewhat lower coloring strength is obtained. Instead of 3.6-diethyldiamino-2.7-dimethyl-xanthone chloride the chloride from 3.6-diethyldimethyldiaminoxanthone or the chloride from 3.6-diethyldiamino-thioxanthone may be treated in an analogous manner.

*Example 3*

100 parts of aniline are added in the cold to an aqueous solution of 100 parts of 3.6-tetramethyl-diamino-xanthone chloride or of 3.6-tetraethyldiamino-xanthone chloride (prepared in a manner analogous to that described in Example 1). After some time, flocks are precipitated which are worked up in the manner described in Example 1. A dyestuff yielding reddish-orange dyeings is obtained.

*Example 4*

1 part of 3.6-tetramethyldiaminothioxanthione are heated together with a mixture of 1 part of anhydrous zinc chloride and 1 part of ammonium chloride at 170° C. until the formation of the dyestuff is completed. The reaction mixture is worked up as usual.

The same dyestuff is obtained in better yields and in a purer form by reacting 3.6-tetramethyldiaminothioxanthione chloride (obtained from 3.6-tetramethyldiaminothioxanthione and phosphorus oxychloride or phosgene) with ammonia in the manner described in Example 1. The dyestuff dyes paper yellow-orange shades of good fastness to boiling.

*Example 5*

1 part of 3.6-tetramethyldiaminothioxanthione chloride (prepared as described in Example 4) is dissolved in 10 parts of water and 1 part of cyclohexylamine is added. The reaction is carried out under the manner set forth in Example 1 and a dyestuff is obtained which yields strongly reddish-yellow dyeings.

What we claim is:—

1. The process of producing dyestuffs which comprises causing a compound of the general formula—

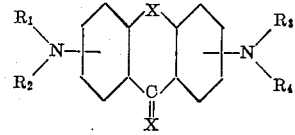

(in which $R_1$, $R_2$, $R_3$ and $R_4$ represent members of the group consisting of hydrogen and alkyl, cycloalkyl, aryl and aralkyl radicals, X represents a member of the group consisting of oxygen and sulphur) to react with a nitrogen compound selected from the class consisting of ammonia and the primary and secondary amines, with the elimination of the lower X and the formation of a linkage between the carbon atom to which this X is attached and the nitrogen atom of the said nitrogen compound.

2. The process of producing dyestuffs which comprises causing a compound of the general formula—

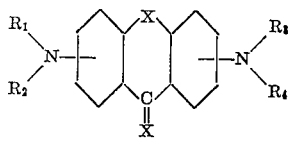

(in which $R_1$, $R_2$, $R_3$ and $R_4$ represent members of the group consisting of hydrogen and alkyl, cycloalkyl, aryl and aralkyl radicals, X represents a member of the group consisting of oxygen and sulphur) to react at between about 0° and 100° C. with a nitrogen compound selected from the class consisting of ammonia and the primary and secondary amines, with the elimination of the lower X and the formation of a linkage between the carbon atom to which this X is attached and the nitrogen atom of the said nitrogen compound.

3. The process of producing dyestuffs which comprises causing a compound of the general formula—

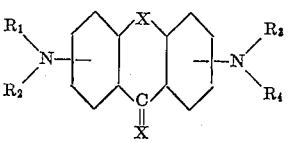

(in which $R_1$, $R_2$, $R_3$ and $R_4$ represent members of the group consisting of hydrogen and alkyl, cycloalkyl, aryl and aralkyl radicals, X represents a member of the group consisting of oxygen and sulphur) to react in the presence of water with a nitrogen compound selected from the class consisting of ammonia and the primary and secondary amines, with the elimination of the lower X and the formation of a linkage between the carbon atom to which this X is attached and the nitrogen atom of the said nitrogen compound.

4. The process of producing dyestuffs which comprises causing a compound of the general formula—

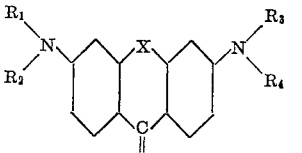

(in which $R_1$, $R_2$, $R_3$ and $R_4$ represent members of the group consisting of hydrogen and alkyl, cycloalkyl, aryl and aralkyl radicles, X represents a member of the group consisting of oxygen and sulphur) to react with a nitrogen compound selected from the class consisting of ammonia and the primary and secondary amines, with the elimination of the lower X and the formation of a linkage between the carbon atom to which this X is attached and the nitrogen atom of the said nitrogen compound.

5. The process of producing dyestuffs which comprises causing a compound of the general formula—

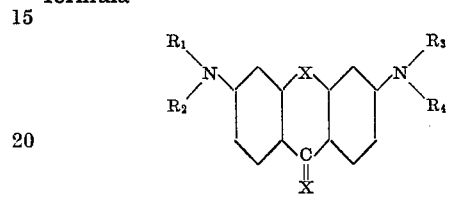

(in which $R_1$, $R_2$, $R_3$ and $R_4$ represent members of the group consisting of hydrogen and alkyl, cycloalkyl, aryl and aralkyl radicles, X represents a member of the group consisting of oxygen and sulphur) to react at between about 0° and 100° C. with a nitrogen compound selected from the class consisting of ammonia and the primary and secondary amines, with the elimination of the lower X and the formation of a linkage between the carbon atom to which this X is attached and the nitrogen atom of the said nitrogen compound.

6. The process of producing dyestuffs which comprises causing a compound of the general formula—

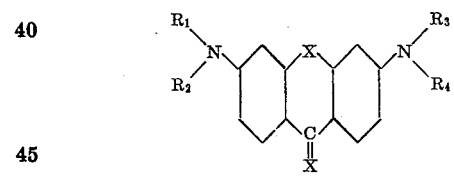

(in which $R_1$, $R_2$, $R_3$ and $R_4$ represent members of the group consisting of hydrogen and alkyl, cycloalkyl, aryl and aralkyl radicles, X represents a member of the group consisting of oxygen and sulphur) to react in the presence of water with a nitrogen compound selected from the class consisting of ammonia and the primary and secondary amines, with the elimination of the lower X and the formation of a linkage between the carbon atom to which this X is attached and the nitrogen atom of the said nitrogen compound.

7. Dyestuffs corresponding to the general formula—

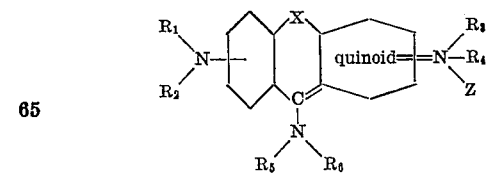

(in which $R_1$, $R_2$, $R_3$ and $R_4$ represent members of the group consisting of hydrogen and alkyl, cycloalkyl, aryl and aralkyl radicles, X represents a member of the group consisting of oxygen and sulphur), Z represents a radicle capable of reacting as a negative radicle in quaternary ammonium compounds and—

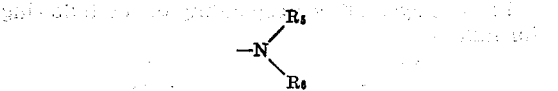

represents the radicle of a compound selected from the class consisting of ammonia and the primary and secondary amines.

8. Dyestuffs corresponding to the general formula—

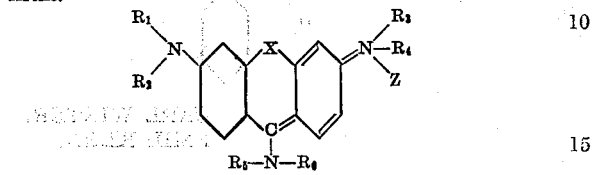

(in which $R_1$, $R_2$, $R_3$ and $R_4$ represent members of the group consisting of hydrogen and alkyl, cyclo-alkyl, aryl and aralykyl radicles, X represents a member of the group consisting of oxygen and sulphur), Z represents a radicle capable of reacting as a negative radicle in quaternary ammonium compounds and—

represents the radicle of a compound selected from the class consisting of ammonia and the primary and secondary amines.

9. Dyestuffs corresponding to the general formula—

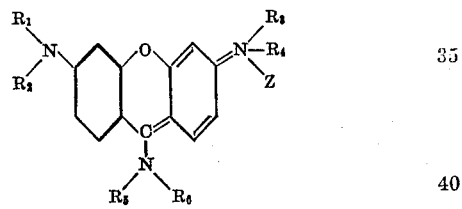

(in which $R_1$, $R_2$, $R_3$ and $R_4$ represent members of the group consisting of hydrogen and alkyl, cycloalkyl, aryl and arakyl radicles, Z represents a radicle capable of reacting as a negative radicle in quaternary ammonium compounds and—

represents the radicle of a compound selected from the class consisting of ammonia and the primary and secondary amines.

10. The dyestuffs corresponding to the following formula—

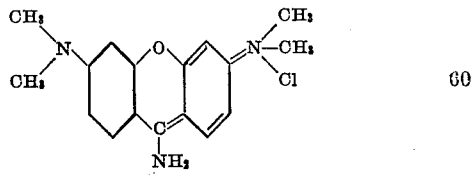

11. The dyestuff corresponding to the following formula—

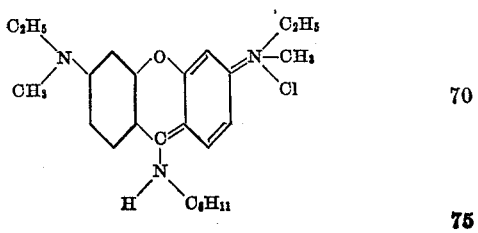

12. The dyestuff corresponding to the following formula—
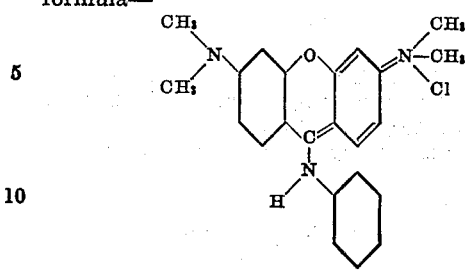
CARL WINTER.
EMIL KERN.